(12) United States Patent
Brown et al.

(10) Patent No.: US 9,306,803 B2
(45) Date of Patent: Apr. 5, 2016

(54) METHODS AND DEVICES FOR IMPLEMENTING CONFIGURATION SYNCHRONIZATION

(75) Inventors: Jeremy Brown, Roseville, CA (US); Shaun Wackerly, Lincoln, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 33 days.

(21) Appl. No.: 12/610,018

(22) Filed: Oct. 30, 2009

(65) Prior Publication Data

US 2011/0106921 A1    May 5, 2011

(51) Int. Cl.
| | | |
|---|---|---|
| G06F 15/177 | (2006.01) | |
| G06F 15/16 | (2006.01) | |
| H04L 12/24 | (2006.01) | |
| H04L 29/08 | (2006.01) | |
| H04W 4/08 | (2009.01) | |
| H04W 8/00 | (2009.01) | |
| H04W 84/18 | (2009.01) | |

(52) U.S. Cl.
CPC ............ *H04L 41/082* (2013.01); *H04L 41/084* (2013.01); *H04L 67/1095* (2013.01); *H04W 4/08* (2013.01); *H04W 8/005* (2013.01); *H04W 84/18* (2013.01); *Y02B 60/43* (2013.01)

(58) Field of Classification Search
CPC . H04L 41/082; H04L 41/084; H04L 67/1095; H04W 4/08; H04W 4/005; H04W 84/18
USPC ........................................................ 709/221
See application file for complete search history.

(56) References Cited

U.S. PATENT DOCUMENTS

| | | | |
|---|---|---|---|
| 6,487,218 B1 | 11/2002 | Ludwig et al. | |
| 7,421,471 B2 | 9/2008 | Van Datta | |
| 7,533,168 B1 * | 5/2009 | Pabla et al. | 709/224 |
| 7,571,227 B1 * | 8/2009 | Pabla | 709/224 |
| 7,583,682 B2 | 9/2009 | Hopkins | |
| 2004/0098447 A1 * | 5/2004 | Verbeke et al. | 709/201 |
| 2007/0253432 A1 * | 11/2007 | Regale et al. | 370/395.53 |
| 2008/0031148 A1 * | 2/2008 | Sagy | 370/252 |
| 2009/0271412 A1 | 10/2009 | Lacapra et al. | |

* cited by examiner

*Primary Examiner* — Tauqir Hussain
(74) *Attorney, Agent, or Firm* — Greer, Burns & Crain, Ltd.

(57) ABSTRACT

Embodiments of the invention provide a network device for implementing configuration synchronization, including a port configured to a receive a configuration file, a memory, and a processing engine configured such that if a configuration file is received on the port, the processing engine determines a neighbor device of the network device and forwards the configuration file to the neighbor device, and wherein if a configuration file is received on the port and the network device is a member of a predetermined peer group, the configuration file is loaded into the memory.

21 Claims, 2 Drawing Sheets

METHODS AND DEVICES FOR IMPLEMENTING CONFIGURATION SYNCHRONIZATION

TECHNICAL FIELD

Embodiments of the present invention relate generally to computer network technology.

BACKGROUND

To facilitate the function and operation of a network device, such network devices are commonly loaded with configuration files. These files provide certain protocol parameters, which dictate precisely how the network device operates and also how it communicates with other network devices. Depending on the relationship between two or more network devices, select parameters often need to be configured in the same way to provide proper and/or effective communication.

Consider an example of two network devices communicating over a network using a particular predefined protocol. Consider further that one of the defined parameters in the protocol is a timer value, which establishes the rate at which packets are sent and received on either end of the network device pair. To facilitate effective communication, it is important that these devices have the same timer value parameter setting in each of the respective configuration files. Failure to ensure such consistency can result in unexpected timeouts, improper state changes in network protocols, or other undesired network behavior. As such, it is important to ensure that the timer value in each respective configuration file is the same.

Further, since configuration files are typically designed to be modified (e.g., the timer value parameter can be increased or decreased depending on the needs of the network or a particular application utilizing the devices), it is important to ensure that changes made to a configuration file on a first device are also made to the configuration files of any other network devices having a synchronization dependent relationship with the first network device. Notably, not all parameters need to be synchronized, but often many are either necessary or preferred for effective communication. Other communication paradigms for which network device configuration synchronization is preferred include, for example, remote mirroring packet operations. As known to those of ordinary skill in the art, typically multiple configuration file parameters need to be synchronized to provide accurate packet mirroring.

DETAILED DESCRIPTION

Figure 1:
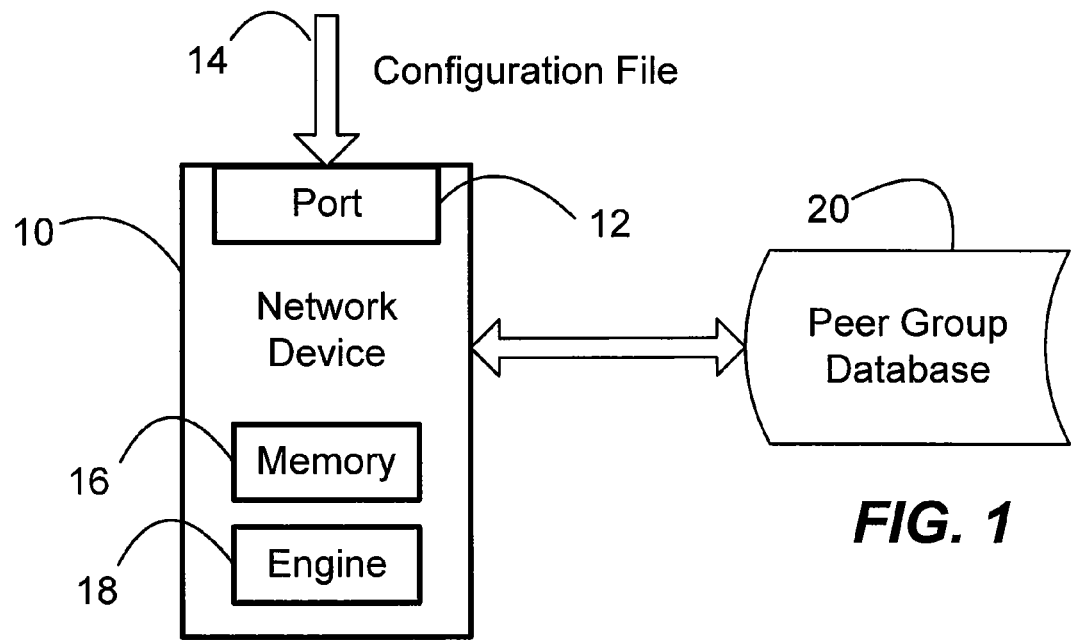
FIG. 1 is a first preferred embodiment of a network device of the present invention.

As described in greater detail in the Background Section, it is often important for multiple network devices to maintain synchronized configuration files to ensure proper or effective communication. As such, when a configuration file in one device is modified, steps should be taken to ensure that corresponding configuration files for other dependent network devices are also modified in the same way. Traditionally, one of three approaches is used to ensure such synchronization.

The first technique is to provide documentation that informs a system administrator or other user that select devices need to be similarly configured to provide effective communication. Use of documentation is common for establishing the timer value requirements as discussed in the Background Section. This technique however, has a clear disadvantage in that administrators must read the documentation, understand it, and manually perform proper configuration of the various relevant devices to ensure compliance with the configuration requirements. The network devices are manually configured by using interfaces such as command line interfaces, web interfaces, simple network management protocol ("SNMP"), etc. This technique is also very time-consuming as the administrator often has a large number of devices, each of which need to be individually manually configured. Further, there is a risk that an administrator will simply overlook configuring all the appropriate devices resulting in potential communication issues.

The second technique is to provide administrators with a warning message once a particular device has been manually configured. This essentially takes the first technique to the next level, by automatically providing the administrator with the relevant configuration synchronization requirements after one of the configuration files has been modified. Therefore, if an administrator modifies the timer value of a network device A, he would receive a warning message stating for example: "The timer value of <network device A> has been modified. To avoid communication issues with other network devices, please ensure the timer values of all other devices communicating with <network device A> are also modified to ensure proper communication." However, again the administrator must manually configure each of the appropriate devices as described above. Such a technique is common in establishing select parameters for facilitating remote mirroring operations as discussed in the Background Section.

Finally, the third technique is to provide administrators with network management applications. Such applications run on a device other than the network device and provide a method of managing multiple network devices at once (i.e., an administrator can manually send a configuration file to multiple devices at one time). Network management applications generally provide a preferred, user-friendly interface as compared to the command line and web interfaces as noted above. However, many administrators are hesitant to use such applications to manage their network devices due to security concerns because by using a network management application, the administrator is then one layer removed from the network device. Further, network management applications are often complex and are difficult to setup. These applications also typically require continual maintenance to properly reflect the available devices as they are added and removed from a network. Finally, while the network management application provides for configuring multiple devices at once, all configuration file updates must still be manually initiated by the administrator. Indeed, the management application merely provides the administrator with the necessary access, but does not initiate the updating of configuration files. Instead, administrators tend to prefer configuring the device by logging into it directly (e.g., by a command line interface).

Embodiments of the invention provide a network device for implementing configuration synchronization wherein the network device is configured to automatically propagate its configuration file to other appropriate network devices such that proper synchronization is dynamically and continually maintained.

Referring now to FIG. 1, a preferred embodiment network device 10 for implementing configuration synchronization is shown. Note that throughout this specification, all references to "a," "an," or "the" refer to at least one unless otherwise specified. Included on the network device 10 is a port 12 for receiving a configuration file 14. Notably, the network device 10 is not limited to any particular type of device, but is preferably a network switch such as a layer-2 or layer-3 switch.

Further included in the network device 10 is a memory 16 and a processing engine 18. The processing engine 18 is configured to load the configuration file 14 into the memory 16 as well as propagate the configuration file 14 to other appropriate network devices 14. To determine these appropriate network devices 14, a peer group is defined which identifies network devices that preferably have the same configuration file 14 (or parameters or other data contained therein). Notably, multiple peer groups can exist with network devices 10 being members of one or more peer groups depending on the complexity and needs of the various network devices and related communication protocols. Information pertaining to the peer groups and its members is preferably maintained in a database 20 which is configured and arranged to be accessible by the network devices 10.

Referring again to the preferred network device 10, when a configuration file 14 is received by the network device (i.e., after being sent manually by an administrator or automatically forwarded by another network device or application), and the network device is determined to be part of a particular peer group (i.e., by querying the database 20), the configuration file 14 is loaded into the memory 16 thereby effectively configuring the network device 10. In a preferred embodiment, the network device 10 is configured to be constantly or periodically listening (e.g., every five seconds) for a configuration file, so no handshake or other negotiation process is necessary to prepare for loading of a configuration file.

To ensure synchronization among additional network devices 10 in that same peer group, the processing engine 18 forwards the configuration file 14 to all of its neighbor devices. Neighbor devices are defined as additional network devices directly-connected to the network device 10. Since neighbor devices are simply additional network devices, they include all the same properties as the network device 10 as described above. As such, like the network device 10, each neighbor device may or may not be a member of a particular peer group.

Since the network device 10 loads and/or forwards configuration files 14 to each of its neighbors (i.e., additional network devices 10), which then each repeat the loading and/or forwarding process, it is proper to describe the operation of the network device 10 as carrying out a recursive method to propagate the configuration file 14 to the appropriate network devices within the peer group. Indeed, each network device 10 is configured such that it will load the configuration file 14 into memory 16 if the device is a member of the appropriate peer group, while also forwarding the configuration file 14 to neighbor devices (i.e., additional network devices 10) such that the process can be repeated until all network devices within the peer group have received the same configuration file. Also, this recursive solution provides for further network integrity by ensuring detection and correction of bugs or anomalies across the network devices (i.e., by maintaining synchronized configuration files 14).

In a preferred embodiment, the neighbors of a network device 10 are discovered by querying the link layer discovery protocol "LLDP" information in the network device 10. As known to those of ordinary skill in the art, LLDP is a constantly running service, which provides, among other things, a list of neighbor network devices 10. When determining the neighbors of a network device 10, in one embodiment the LLDP information is compared with the peer group lists in the database 20 to ensure that configuration files 14 are not forwarded to neighbors, which do not ultimately reach a network device in the peer group.

Figure 2:
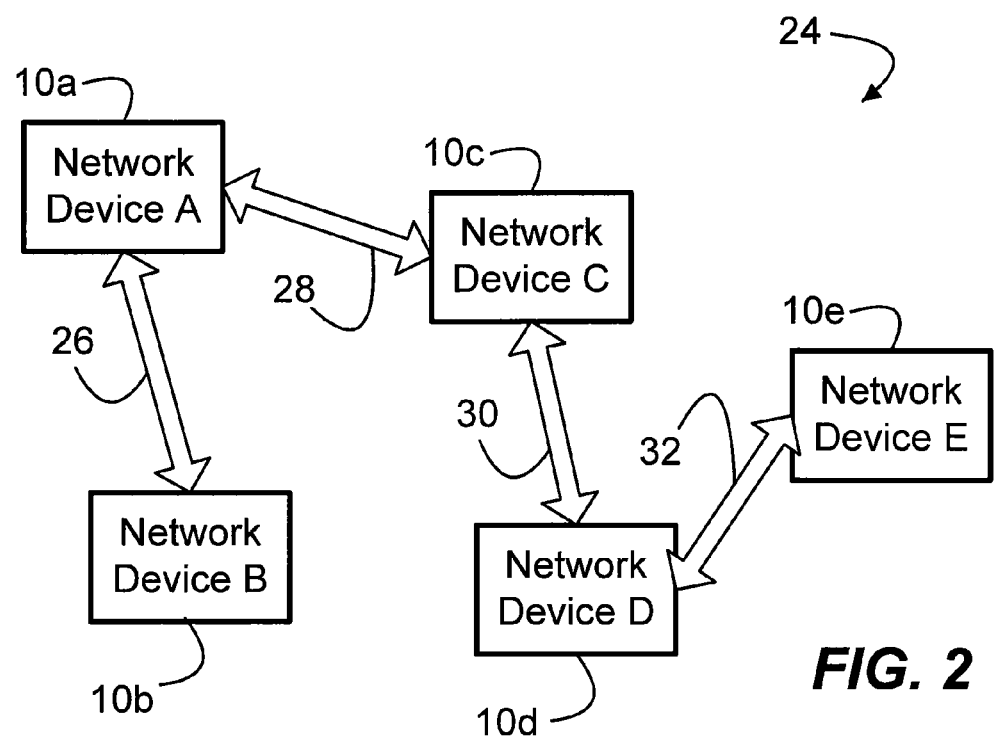
FIG. 2 is a depiction of a network including multiple embodiments of the device of FIG. 1.

To illustrate this propagation technique, consider the example network 24 shown in FIG. 2. First, presume that network device A has been provided with a modified configuration file 14 by an administrator and that network devices A, B, and E are part of the same peer group (network devices C and D are not part of the peer group). Once the configuration file 14 is loaded into network device A, the configuration file is forwarded to each of its neighbors (network devices B and C). When network device B receives the configuration file 14, it is loaded into memory since network device B is part of the peer group. Since network device B has no neighbors (note network device A is not considered a neighbor since it was the initial sender of the configuration file 14), network device B takes no further action. When network device C receives the configuration file 14, it does not load it into memory since it is not a member of the peer group. However, network device C forwards the configuration file 14 to each of its neighbors (network device D). Similarly, network device D does not load the configuration file 14 because it is not a member of the peer group, but it does forward the configuration file 14 to each of its neighbors (network device E). When network device E receives the configuration file 14, it is loaded into memory because it is a member of the peer group. However, since network device E has no neighbors, it takes no further action. Therefore, following the recursive propagation technique, network devices A, B, and E will have each received the updated configuration file 14 and will be properly synchronized, while the configuration files 14 of network devices C and D remain unchanged.

Notably, the method of distribution to the remaining appropriate network devices 10 depends on the network topology. Indeed, any of several network-tree or directed-graph traversal techniques may be employed to ensure each destination network device 10 is reached.

Further, when reference is made to a configuration file 14 through this description, it is noted that while the entire configuration file may be propagated through the network and loaded on to other network devices 10, in many instances only a particular portion of the configuration file will be forwarded and modified. Indeed, depending on the defined peer group and specifically the relationship between the network devices 10 in the peer group, only a portion of the configuration file 14 may need to be to be synchronized to provide for effective communication. Indeed often only a single protocol parameter (e.g., the timer value) is necessary to ensure that multiple network devices are able to facilitate proper or effective communication. As such, the term configuration file should be construed to include a file containing all of the settings for a network device as well as a portion of such settings (i.e., one or more parameters).

In a preferred embodiment, SNMP Management Information Base ("MIB") data is used to represent the configuration file 14. As known to those of ordinary skill in the art, MIB data is typically maintained on any network device, and contains information regarding the device's protocol parameters and other communication-related information. However, notably, the configuration file 14 is not limited to being based on MIB data. Indeed, other types of configuration files (e.g., plain-text formatted files) are also considered and could be used to synchronize the network devices 10.

Figure 3:
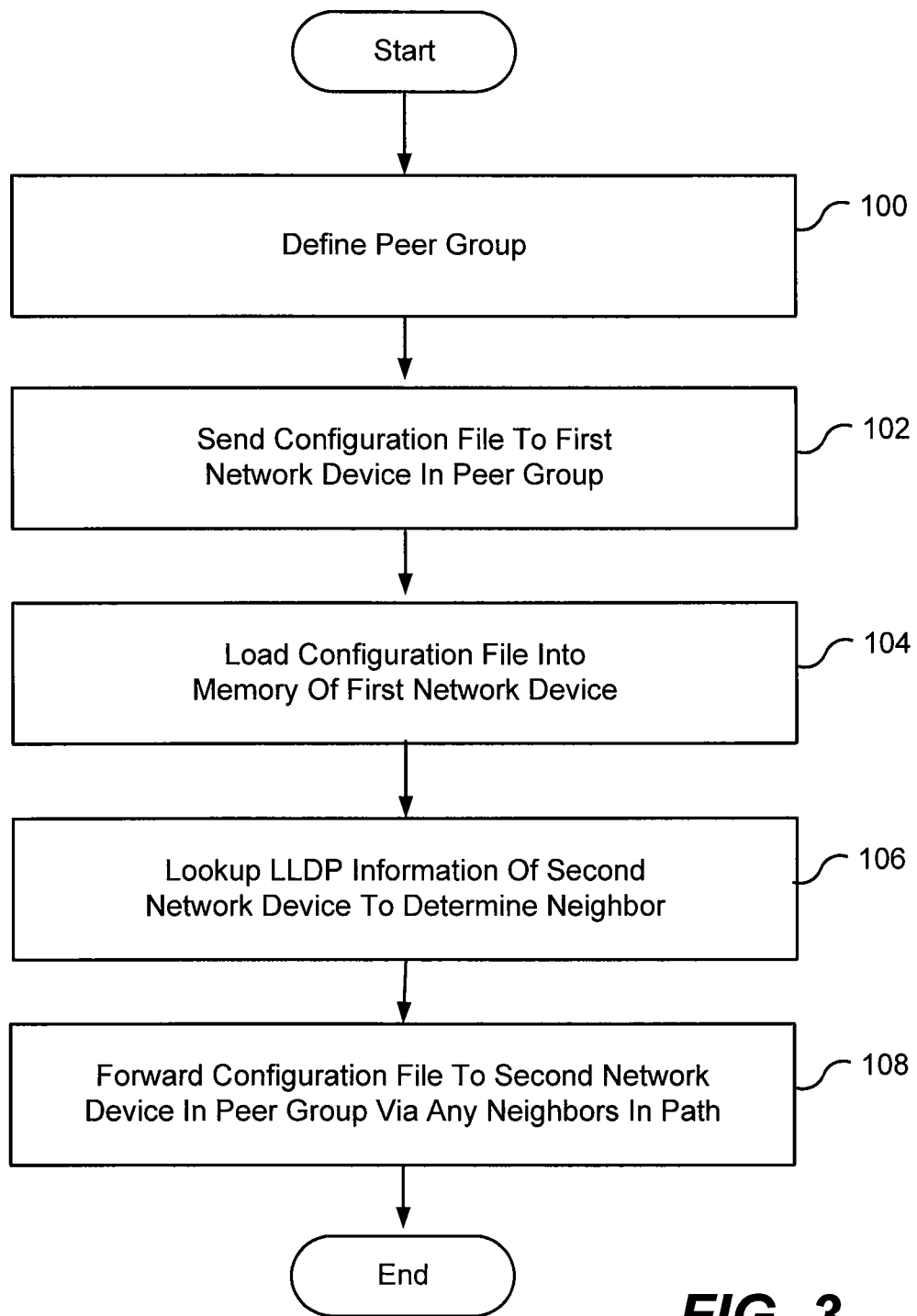
FIG. 3 is a flowchart depicting a method of a first preferred embodiment of the present invention.

Referring now to FIG. 3, the preferred embodiment of the present invention will now be discussed with respect to the steps depicted in flow chart form. To implement a preferred method of configuration synchronization, in step 100, a peer group is defined which identifies a plurality of network devices 10 within a network. Notably, such network devices 10 are logically grouped according to some communication paradigm (i.e., so that the grouped devices benefit from having at least a portion of their respective configuration files synchronized). In step 102, a configuration file 14 is sent to a network device 10 in the peer group and in step 104, the configuration file is loaded into a memory 16 of the network device 10. In step 106, the LLDP information of the network device 10 is looked up to determine the neighbors to which the configuration file 14 should be forwarded. In step 108, the configuration file 14 is forwarded from the network device 10 to a neighbor network device.

Each of the steps described above are preferably carried out by the processing engine 18, which can be implemented using, among other things, hardware, software (i.e., instructions stored on a computer-readable medium), or a combination of both. However, notably the steps can also be performed manually and/or by other components in or associated with the network device 10.

In preferred embodiments of the present invention, the network device 10 is a network switch. However, any network device, which received a configuration file 14 is also contemplated and could be used instead of a network switch.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A network device for implementing configuration synchronization, comprising:
    a port configured to a receive a configuration file;
    a memory; and
    a processing engine;
    wherein said processing engine is configured such that:
        when a configuration file is received on said port, said processing engine determines whether said network device containing the processing engine is a member of a peer group, defined using a link layer discovery protocol, that corresponds to said configuration file and loads any corresponding configuration file into said memory; and
        said processing engine forwards said configuration file to at least one neighbor device of said network device to propagate configuration files throughout a network for configuration synchronization.

2. The network device of claim 1 wherein said neighbor device is a member of said peer group.

3. The network device of claim 2 wherein said processing engine determines a neighbor device by reading a link layer discovery protocol maintained in said network device.

4. The network device of claim 1 wherein said configuration file includes a protocol parameter and wherein said peer group represents a group of network devices each requiring the same protocol parameter to facilitate effective communication.

5. The network device of claim 4 wherein said protocol parameter is a timer value.

6. The network device of claim 4 wherein said protocol parameter provides for packet mirroring.

7. The network device of claim 1 wherein said network device is a layer-2 switch.

8. The network device of claim 1 wherein said network device is a layer-3 switch.

9. A method of implementing configuration synchronization, comprising:
    receiving a configuration file with a network device that is on a network comprising a defined peer group, said peer group identifying a plurality of network devices within the network using a link layer discovery protocol;
    determining whether the configuration file corresponds to a peer group of which the network device is a member;
    loading the configuration file into a memory of the network device when the network device is a member of the peer group to which the configuration file corresponds; and
    forwarding the configuration file from the network device to a neighbor device to propagate configuration files throughout the network for configuration synchronization.

10. The method of claim 9 wherein the neighbor device is a member of the peer group.

11. The method of claim 9 wherein the neighbor device is determined by reading a link layer discovery protocol of the network device.

12. The method of claim 9 wherein the configuration file includes a protocol parameter and wherein the peer group represents a group of network devices each requiring the same protocol parameter to facilitate effective communication.

13. The method of claim 12 wherein the protocol parameter is a timer value.

14. The method of claim 12 wherein the protocol parameter provides for facilitating packet mirroring.

15. The method of claim 9, wherein the network device is a layer-2 network switch.

16. The method of claim 9 wherein the network device is a layer-3 network switch.

17. A non-transitory computer-readable medium associated with a network device, containing instructions that, when executed, causes:
    receiving a configuration file by a receiving network device which is a member of a peer group, the peer group identifying a group of network devices;
    determining whether the configuration file is to be used by the receiving network device by determining whether the configuration file corresponds to the peer group of which the receiving network device is a member;
    only when the configuration file corresponds to the peer group of which the receiving network device is a member, loading the configuration file into a memory of the network device; and
    forwarding the configuration file from the receiving network device to a neighbor device.

18. The computer-readable medium of claim 17 wherein the neighbor device is a member of the peer group.

19. The computer-readable medium of claim 17 wherein the neighbor device is determined by reading a link layer discovery protocol of the network device.

20. The computer-readable medium of claim 19 wherein the configuration file includes a protocol parameter and wherein the peer group is a group of network devices each requiring the same protocol parameter to facilitate effective communication.

21. The network device of claim 1 wherein said processing engine is configured to listen for said configuration file.

* * * * *